United States Patent
Chaar et al.

(10) Patent No.: US 8,463,670 B2
(45) Date of Patent: Jun. 11, 2013

(54) AUTOMATED TIME TRACKING

(75) Inventors: Jarir Kamel Chaar, Ardsley, NY (US);
William R Cope, Jr., Atlanta, GA (US);
Per J Kroll, Cary, NC (US); Gaston Robert Williams, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/071,991

(22) Filed: Mar. 25, 2011

(65) Prior Publication Data

US 2012/0246655 A1 Sep. 27, 2012

(51) Int. Cl.
*G06F 15/02* (2006.01)

(52) U.S. Cl.
USPC ........... 705/32; 705/11; 705/7.29; 700/14; 709/206; 714/39

(58) Field of Classification Search
USPC ........... 705/32, 7.11, 7.29, 7.32, 7, 9; 714/39; 235/377; 700/14; 709/206
See application file for complete search history.

(56) References Cited

U.S. PATENT DOCUMENTS

| | | | |
|---|---|---|---|
| 7,725,338 B1 * | 5/2010 | Wong | 705/7.11 |
| 7,836,448 B1 | 11/2010 | Farizon et al. | |
| 7,881,990 B2 | 2/2011 | Slattery | |
| 7,908,192 B2 * | 3/2011 | Srinivasan et al. | 705/32 |
| 8,015,080 B2 * | 9/2011 | Kerschbaum et al. | 705/28 |
| 8,041,587 B2 * | 10/2011 | Watson et al. | 705/7.11 |
| 8,135,635 B2 * | 3/2012 | Molotsi et al. | 705/32 |
| 8,214,238 B1 * | 7/2012 | Fairfield et al. | 705/7.11 |
| 2008/0189162 A1 * | 8/2008 | Ganong et al. | 705/9 |

OTHER PUBLICATIONS

Dong, Xin (Luna) and Halevy, Alon. "A Platform for Personal Information Management and Integration." Conference on Innovative Data Systems Research—CIDR. 2005.

"Team TimeSheet for Outlook (Manager Tool)." Version 3.0. AssistMyTeam SMB Solutions. NJ. Document received date Feb. 14, 2011. Product Release date Jan. 17, 2011. <http://www.assistmyteam.net/downloads/manuals/TeamTimeSheetManager.pdf>.

* cited by examiner

*Primary Examiner* — Vanel Frenel
(74) *Attorney, Agent, or Firm* — Jason H. Sosa; John R. Pivnichny

(57) ABSTRACT

In a method for automatically tracking time, a computer receives a user identification. The computer automatically starts a first task, based on the received user identification. The computer records a start time for the first task. The computer monitors a state of the first task. The computer automatically records an end time for the first task in response to determining that the state of the first task has changed.

20 Claims, 8 Drawing Sheets

ND OF THE INVENTION

The present invention relates generally to time tracking applications, and more specifically to automatically tracking and reporting time spent on completing a project.

BACKGROUND

Project managers are responsible for tracking the amount of time individual team members spend on particular tasks of a project. By accurately tracking time spent on tasks, project managers are able to calculate labor costs associated with implementing the project. Project managers are also able to identify potential inefficiencies in implementing the project by comparing actual time being spent on a task to the time allocated to the task. Project managers are able to utilize the tracked time spent on the project to make adjustments to the project plan as the project is being implemented. Project managers are also able to utilize the information to more accurately plan future projects. Existing project management tools, such as Microsoft's Team Timesheet for Outlook™ program, enable a project manager to track time spent on a project. These tools, however, rely on users manually inputting time information. Manually inputting time information can lead to errors and thus inaccurate time information.

Known business process automation tools, such as IBM's Rational Team Concert™ program, WebSphere Process Server™ program, WebSphere Business Modeler™ program, and Websphere Lombardi™ program, enable a project manager to define process activities, allocate resources to the activities, and collect data on the progress of the activities. The known business process automation tools track actual time spent to complete process steps and compute labor costs associated with performing a selected process. Known business process automation tools, however, do not automatically track time spent on a process by an individual team member. A human synchronizing data generated by the business process automation tool with data tracked by a project management tool is time consuming and error-prone. A human synchronizing the data when team members work in multiple disconnected environments is more time consuming and more error-prone.

SUMMARY

In a first embodiment of the present invention, there is a method for automatically tracking time. The method comprises a computer receiving a user identification. The method comprises a computer automatically starting a first task, based on the received user identification. The method comprises a computer recording a start time for the first task. The method comprises a computer monitoring a state of the first task. The method comprises a computer automatically recording an end time for the first task in response to determining that the state of the first task has changed.

In a second embodiment of the present invention, there is a computer system for automatically tracking time. The system comprises one or more processors, one or more computer-readable memories, one or more computer-readable tangible storage devices, and program instructions stored on at least one of the one or more storage devices for execution by at least one of the one or more processors via at least on of the one or more memories. The program instructions comprise first program instructions to receive a user identification. The program instructions comprise second program instructions to automatically start a first task, based on the received user identification. The program instructions comprise third program instructions to record a start time for the first task. The program instructions comprise fourth program instructions to monitor a state of the first task. The program instructions comprise fifth program instructions to automatically record an end time for the first task in response to determining that the state of the first task has changed.

In a third embodiment of the present invention, there is a computer program product for automatically tracking time. The computer program product comprises one or more computer-readable tangible storage devices and program instructions stored on at least one of the one or more storage devices. The program instructions comprise first program instructions to receive a user identification. The program instructions comprise second program instructions to automatically start a first task, based on the received user identification. The program instructions comprise third program instructions to record a start time for the first task. The program instructions comprise fourth program instructions to monitor a state of the first task. The program instructions comprise fifth program instructions to automatically record an end time for the first task in response to determining that the state of the first task has changed.

DETAILED DESCRIPTION

Figure 1:
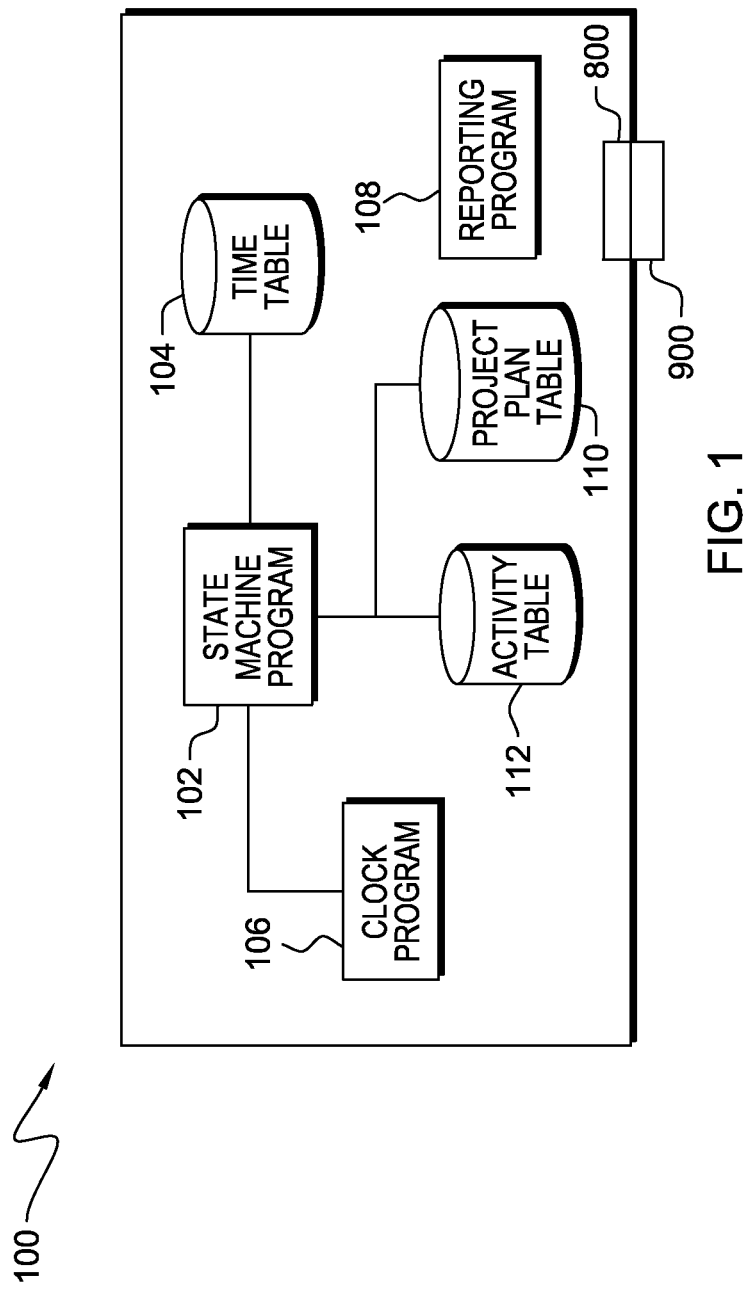
FIG. 1 illustrates a computer system for automatically tracking time, according to one embodiment of the present invention.

The present invention will now be described in detail with reference to the Figures. FIG. 1 illustrates a computer system 100 for automatically tracking time, according to one embodiment of the present invention. Computer system 100 includes a state machine program 102 for tracking the state of an activity of a project from start to finish. Activity states include "Closed," "Open," "Suspended," and "Complete." State machine program 102 automatically detects state changes as follows, and updates a time table 104 accordingly. For example, state machine program 102 automatically detects when a user opens a task, via a user interface for example, and automatically records a first time stamp in time table 104. The first time stamp represents a start time for work performed by the user on the task. Similarly, state machine program 102 automatically detects when a user closes a task and automatically records a second time stamp in time table 104. The second time stamp represents an end time for work performed by the user on the task. State machine program 102 also automatically records time when a user suspends work on a task, for example, to make a phone call. State machine program 102 may automatically detect when a user suspends work on a task. For example, state machine program 102 may automatically determine that a user has suspended work on a task if state machine program detects that a user has opened an application on computer system 100 that is unrelated to the performing the task, such as a web browser. State machine program 102 may also detect when a user suspends work on a task by receiving input from the user. Such time may or may not be included in the total time spent on the task depending on whether the activity performed by the user during suspend state is productive or non-productive. State machine program 102 determines whether the user activity during the suspended state is productive either automatically, based on known activities, or based on user input.

Time table 104 stores the time stamps recorded by state machine program 102. State machine program 102 records each time stamp as either a start or end time and associates the time stamp with a specific task for a specific user on a specific project. A time stamp may also be associated with a user for an activity performed by the user even if the activity is not specifically defined as a task for the project. Reporting program 108 subtracts a start time from an end time to calculate the amount of time a user spent on a task. Reporting program 108 adds up all of the calculated times of a user for a specific task to obtain the total amount of time a user has spent on a specific task. Reporting program 108 also adds up all time spent by all users for a specific task, for a specific project and for a combination of projects, as requested by a manager or billing department. As a result, reporting program 108 is able to generate time reports in real time for a specific user, task, or project, or any combination thereof. In one example, time table 104 stores time stamps for multiple projects concurrently. In such an example, reporting program 108 is able to generate real time reports across multiple projects. For example, reporting program 108 may generate a report indicating all of the projects that a user has worked on over the course of a month and how much time the user spent on individual tasks associated with each project.

Computer system 100 includes a clock program 106 to determine the start and stop times as a user starts, suspends and stops work on a task. State machine program 102 automatically captures time stamps from clock program 106 as state machine program 102 detects state changes.

Computer system 100 has a project plan table 110 for storing information about the various tasks associated with a project, to whom the tasks are assigned, and the order in which the tasks should be performed. Project plan table 110 is pre-defined by a project manager or a systems administrator. By accessing the project plan table, state machine program 102 is able to automatically determine each task assigned to a user and determine the next uncompleted task assigned to the user.

Computer system 100 has an activity table 112 for storing specification of different types of activities which are not formally defined as tasks in project plan table 110, and whether the informal activity is considered "productive". Activity table 112 may predefined by a project manager or systems administrator. Activity table 112 may also be defined in real time by a user while working on a project. For example, during the project performance, users/workers identify time associated with a task which is not formal task time, but is classified as an informal task (such as attending specified types of meetings and eating lunch) in activity table 112. Whether or not an activity is productive determines how the time spent on the activity will be handled/billed by reporting program 108. For example, taking a lunch break may not be a productive activity while attending an unplanned meeting with the project team may be a productive activity even though it was not defined in project plan table 110. Reporting program 108 may include, in a report, a section detailing how much time a user spent on a project performing unproductive activities such as eating lunch. Similarly, reporting program 108 may include, in a report, a section detailing how much time a user spent on a project performing productive activities such as attending unplanned project meetings. State machine program 102 tracks the state of such activities not defined in project plan table 110 just as it tracks activities that are defined in project plan table 110. If a user performs an activity which is undefined in both project plan table 110 and activity table 112, the user may define the new activity as productive or not and store the new activity in activity table 112 for future reference.

Time tracking computer system has internal components 800 and external components 900 that will be described in further detail in FIG. 8.

It should be understood that although the example embodiment of FIG. 1 illustrates a single computer for automatically tracking time, computer system 100 can also be implemented as a server in a networked environment that is accessed by multiple client computers for automatically tracking time for tasks performed by multiple users on the multiple client computers.

Figure 2:
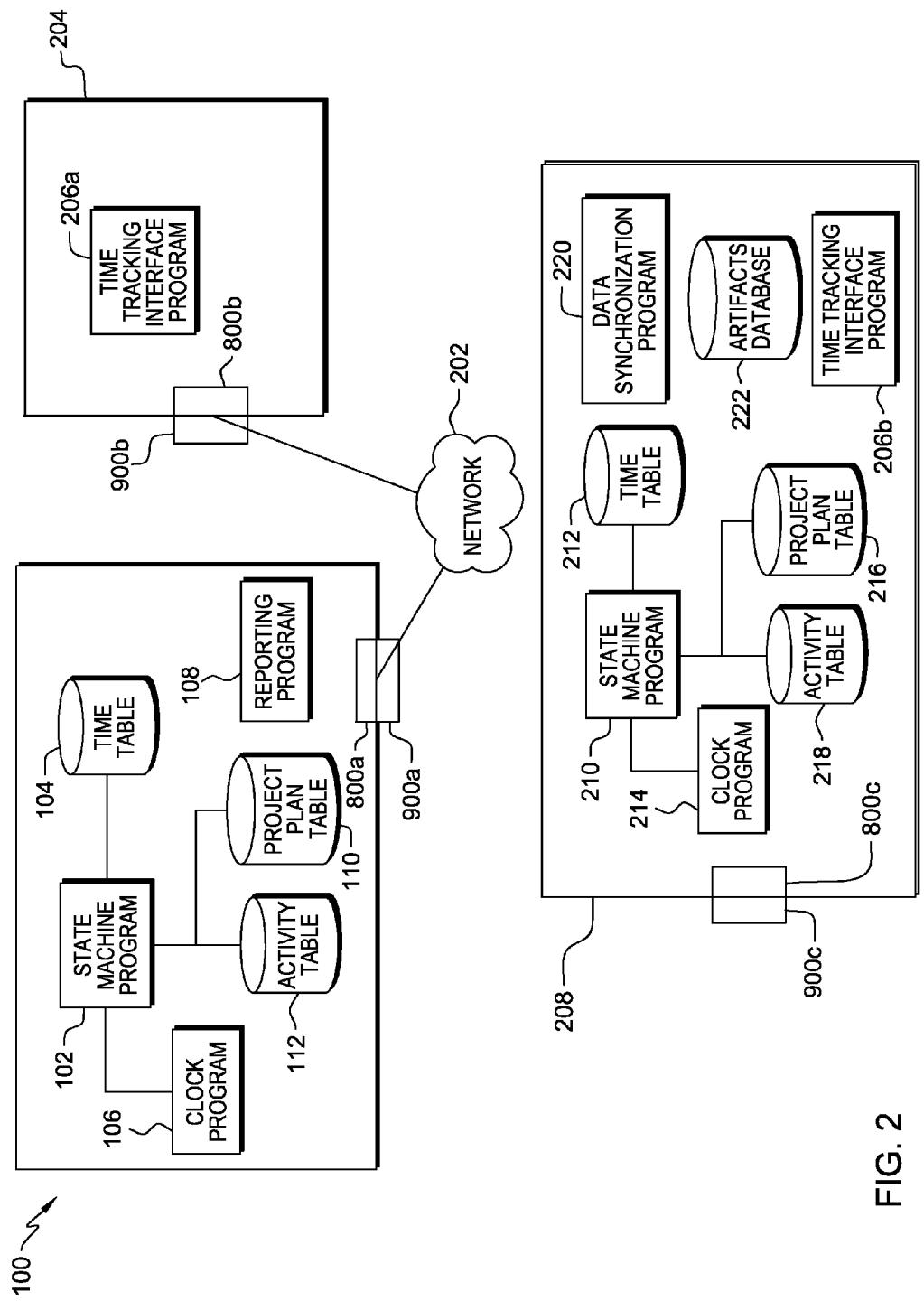
FIG. 2 illustrates the computer system of FIG. 1, in a distributed and disconnected environment, according to one embodiment of the present invention.

FIG. 2 illustrates the computer system 100 for automatically tracking time of FIG. 1, in a distributed and disconnected environment, according to one embodiment of the present invention. Computer system 100 tracks time for tasks performed by multiple users on multiple client computers. Computer system 100 communicates with the multiple client computers via network 202. Connected client computer 204 has time tracking interface program 206a for interfacing with state machine program 102 on computer system 100. Time tracking interface program 206a interfaces with state machine program 102 to notify state machine program 102 when a user performs a task on connected client computer 204. State machine program 102 tracks and records the amount of time the user spends on the task on the connected client computer 204. Time table 104 stores time stamps generated by state machine program 102 for tasks performed by the user on the connected client computer 204. As a result, reporting program 108 is able to utilize time table 104 to generate time reports in real time for a number of users working on a number of connected client computers, regardless of where the users are physically located.

Disconnected client computer 208 has a local state machine program 210, a local clock program 214, a local activity table 218, a local time table 212, and a local project plan table 216 which function similarly to the state machine program 102, clock program 106, activity table 112, time table 104, and project plan table 110 of computer system 100. Disconnected client computer 208, however does not track time for tasks performed by multiple users on multiple client computers as does computer system 100. Instead, disconnected client computer 208 tracks time for tasks performed only by users on disconnected client computer 208. Thus, local time table 212 only stores time stamps generated by local state machine program 210. It should be understood that although disconnected client computer 208 is illustrated as being isolated from network 202, disconnected client computer 208 is capable of connecting to network 202 and communicating with computer system 100. Disconnected client computer 208 also has a time tracking interface program 206*b* to interface with state machine program 102. Thus, disconnected client computer 208 is able to utilize either local state machine program 210 or state machine program 102 to track time spent on task performed by users on disconnected client computer 208, depending on whether or not disconnected client computer 208 is connected to network 202.

Disconnected client computer 208 has a data synchronization program 220 for synchronizing time stamps stored in local time table 212 with time stamps stored in time table 104. Data synchronization program 220 can be configured to synchronize data automatically when disconnected client computer 208 connects to network 202. Alternatively, data synchronization program can be configured to synchronize in response to user input.

Data synchronization program 220 also synchronizes tasks assigned to a specific user between project plan table 110 and local project plan table 216. Thus, local project plan table 216 may store only tasks assigned to a specific user of disconnected client computer 208. Artifacts associated with tasks assigned to the user are stored in artifacts database 222 so that the user will be able to work on the tasks in a disconnected environment. Data synchronization program 220 ensures that artifacts, such as documents and spreadsheets, associated with the synchronized tasks are available in artifacts database 222.

Figure 3:
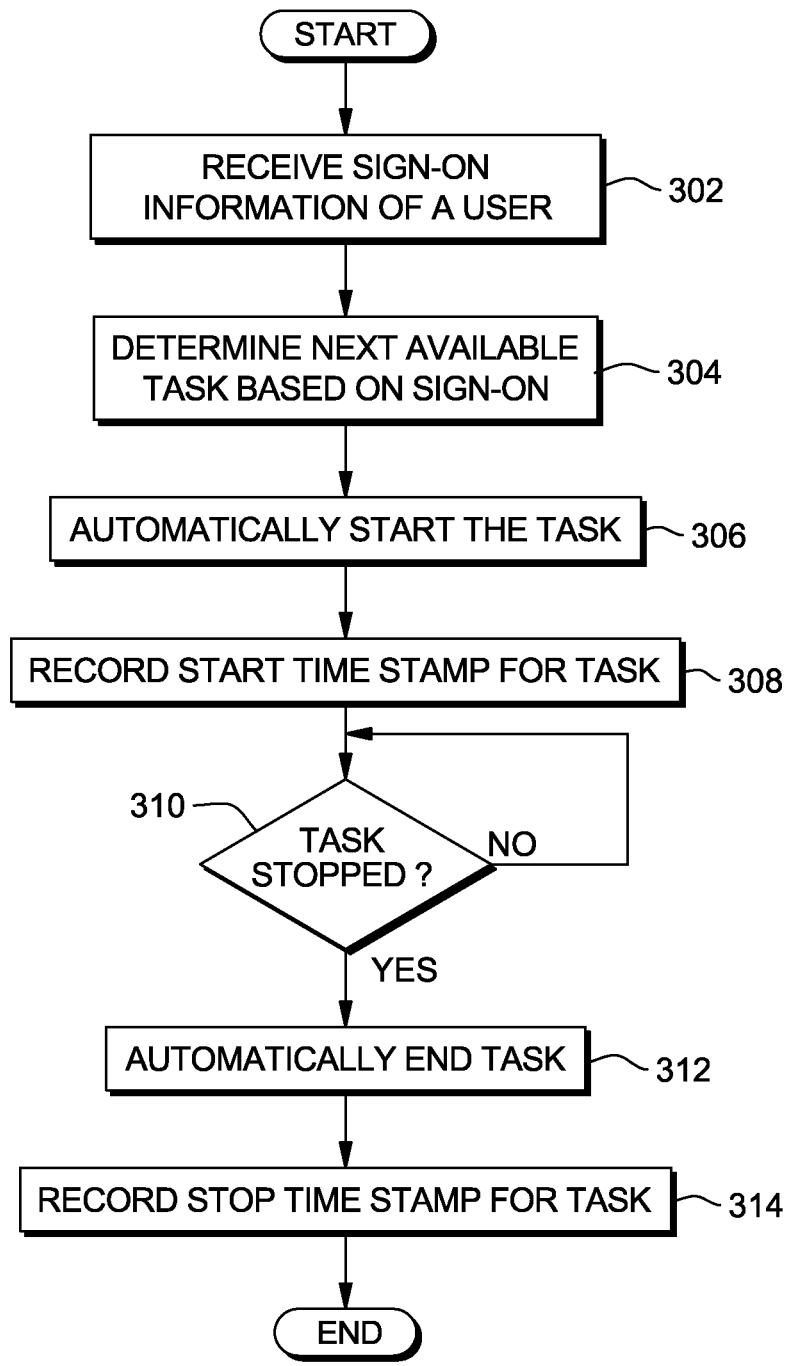
FIG. 3 illustrates a flow chart of a state machine program of FIG. 1 for automatically tracking time, according to one embodiment of the present invention.

FIG. 3 illustrates a flow chart of the state machine program 102 of FIG. 1 for automatically tracking time, according to one embodiment of the present invention. At step 302, state machine program 102 receives sign-on credentials of a user. Based on the received sign-on credentials, state machine program 102 determines, at step 304, the next available task for the user to work on by accessing project plan table 110. The next available task can be a new task or it can be a suspended task that was already started by the user at a previous time. At step 306, state machine program 102 automatically starts the next available task as determined in step 304. Automatically starting the task can include, for example, opening an application, loading an electronic file, or other similar functions necessary for the user to begin to work on the task. Next, at step 308, state machine program 102 accesses clock program 106 to obtain a start time stamp and records the start time stamp for the task in time table 104.

At decision 310, state machine program 102 detects whether the user has stopped working on the task. When state machine program 102 determines that the user has stopped working on the task (decision 310, yes branch), state machine program 102 automatically ends the task at step 312. State machine program 102 then accesses clock program 106 to obtain a stop time stamp and records, at step 314, the stop time stamp for the task in time table 104.

It should be understood that although FIG. 3 illustrates that state machine program 102 ends after recording the stop time stamp at step 314, state machine program 102 may continue to again determine the next available task based on the received sign-on, at step 304, after recording the stop time stamp at step 314. For example, a user may stop working on a task because the user completed working on the task. State machine program 102 may detect that a user has completed a task based on user input. State machine program 102 may also automatically detect that a task is complete. For example, state machine program 102 may determine that a user has completed a task if the user has delivered all work product related to the task to computer system 100. State machine program 102 automatically starts the next assigned task for the user. Referring again to decision 310, no branch, where the user has not stopped working on the task, state machine program 102 loops back to wait for an interrupt or other signal from the user interface indicating that the user has stopped working on the task.]

Figure 4:
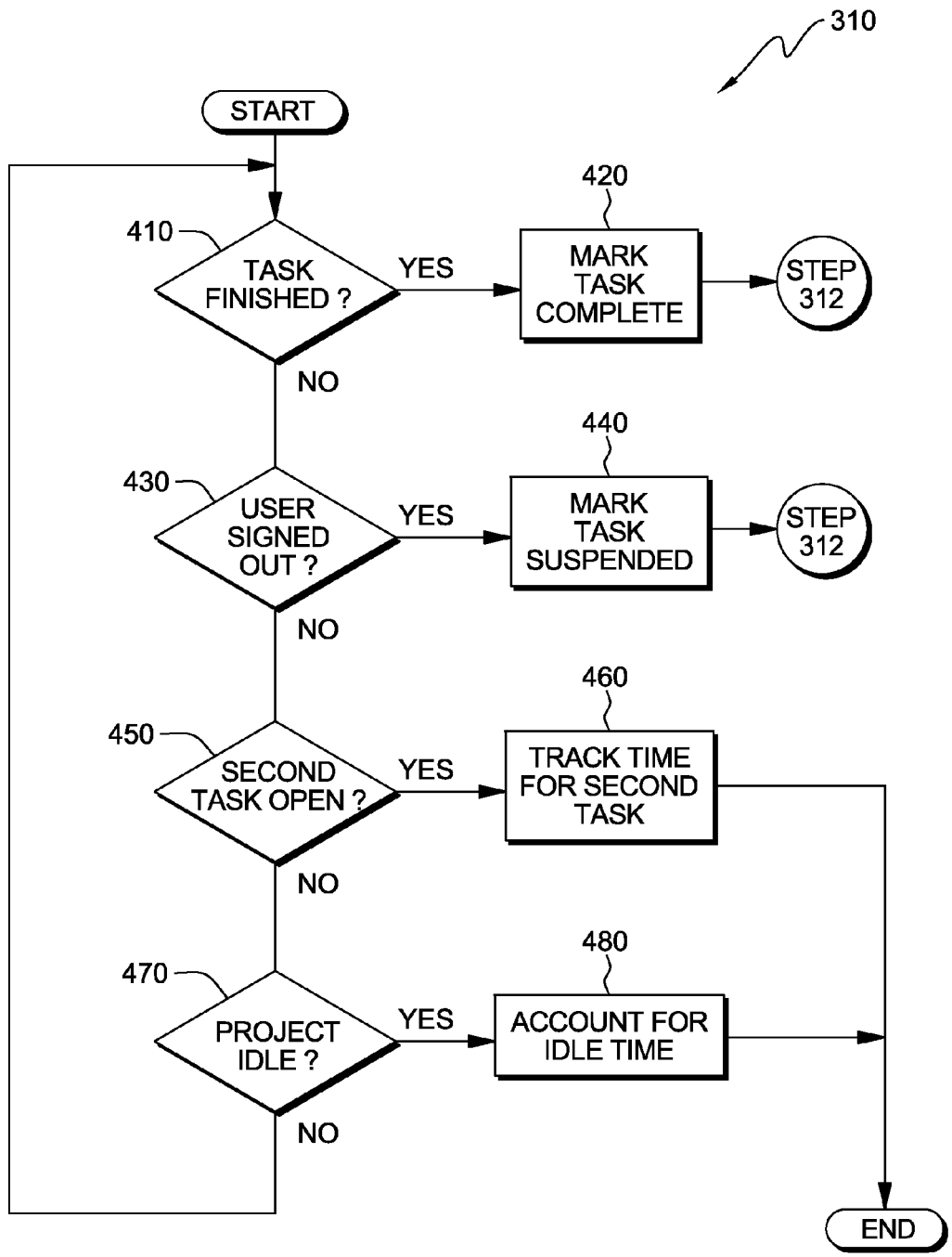
FIG. 4 illustrates a flow chart of a state machine program of FIG. 1 for detecting whether a user has stopped working on a task, according to one embodiment of the present invention.

FIG. 4 illustrates a flow chart of the state machine program 102 of FIG. 1 for detecting whether a user has stopped working on a task, for example, in step 310 of FIG. 3, according to one embodiment of the present invention. The user may stop working on a task for four reasons: the user has completed the task, the user decides to take a break and sign out, the user starts work on a second task, or the user starts performing an activity outside of the project plan, without signing out, in which case the project becomes idle. If state machine program 102 determines that the user has completed the task (decision 410, yes branch), state machine program 102 marks the task as complete, at step 420, in project plan table 110. If state machine program 102 determines that the user has signed out but that the user has not yet completed the task (decision 410, no branch and decision 430, yes branch), state machine program 102 marks the task as suspended, at step 440, in project plan table 110. If state machine program 102 determines that the user has not yet completed the task but instead has opened a second task (decision 430, no branch and decision 450, yes branch), state machine program 102 tracks the time for the second task, at step 460. If state machine program 102 determines that the project has become idle (decision 450, no branch and decision 470, yes branch), meaning that the user is not currently working on any tasks associated with the project in project plan table 110, state machine program 102 accounts for project idle time at step 480.

State machine program 102 may determine that the project is idle if state machine program 102 does not detect any work being performed by the user on tasks associated with the project for a predefined time period. For example, state machine program 102 may determine that a task is idle if computer system 100 has not received any input for a predetermined period of time. Alternatively, state machine program 102 may determine that the project is idle in response to an automatic trigger generated by computer system 100. For example, state machine program 102 may automatically begin to account for idle project time when computer system 100 receives a phone call. Known programs such as Cisco's VoiceRite™ program and IBM's SameTime Telephony™ program, for example, may enable computer system 100 to automatically detect an incoming phone call. Similarly, state machine program 102 may automatically begin to account for idle time when computer system 100 is locked, when computer system 100 launches an application unrelated to the project, or when other similar types of triggers are generated by computer system 100.

Figure 5:
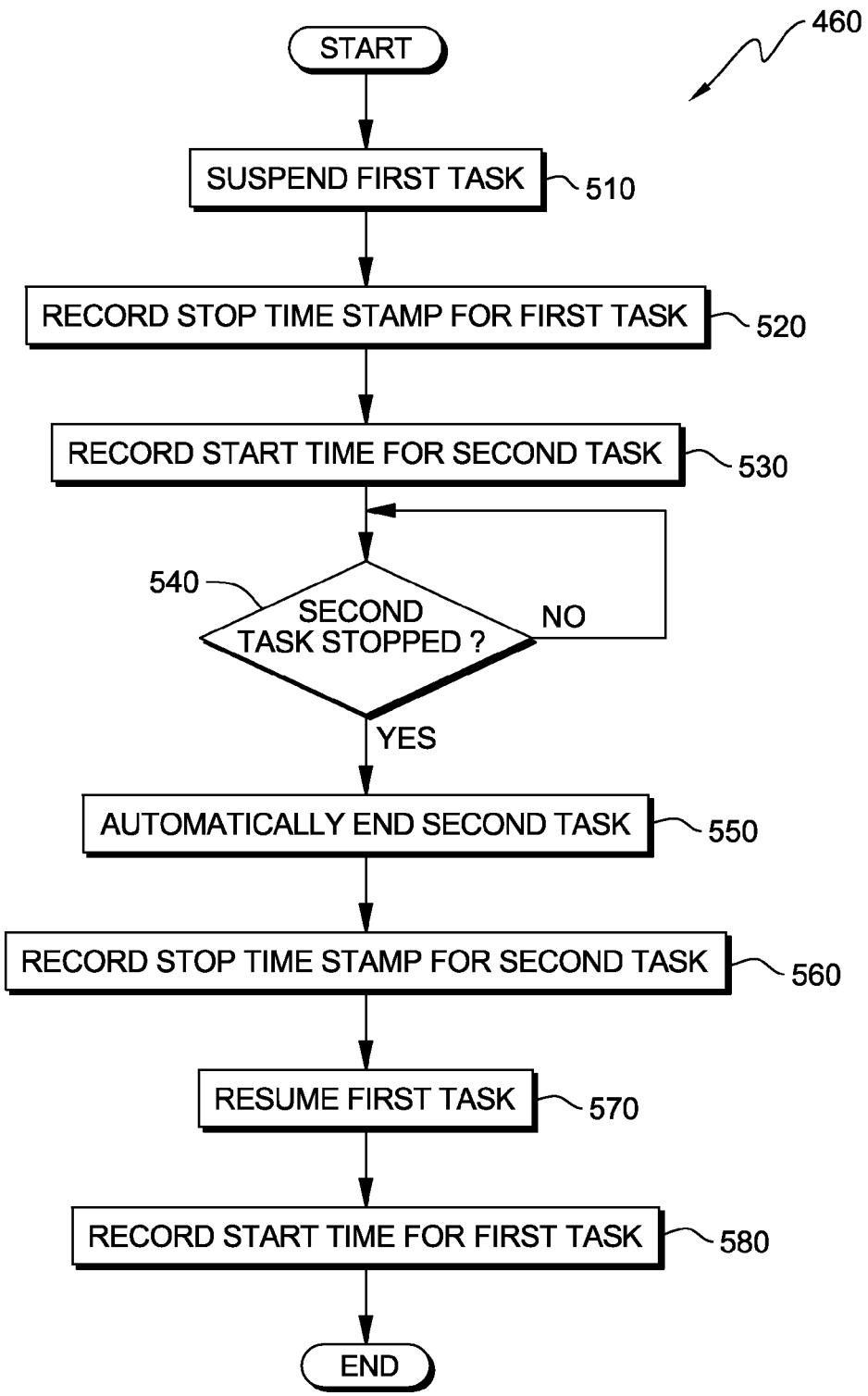
FIG. 5 illustrates in more detail a step performed by the state machine program of FIGS. 1 and 4 for automatically tracking time of a second task, according to one embodiment of the present invention.

Referring again to decision 450, yes branch where the user opens a second task, state machine program 102 proceeds to track time expended by the user working on the second task (step 460). FIG. 5 illustrates step 460 in more detail. In response to detecting that a user has opened another project task (decision 450, yes branch), state machine program 102 suspends the prior opened task, at step 510, by marking the task as suspended in project plan table 110. State machine program 102 then accesses clock program 106 to obtain a stop time stamp and records a stop time stamp for the prior task, at step 520, in time table 104. State machine program 102 also accesses clock program 106 to obtain a start time stamp and records a start time stamp for the other task, at step 530, in time table 104. When state machine program 102 determines that the user has stopped working on the second task (decision 540, yes branch), state machine program automatically ends the second task, at step 550. Depending on whether the user completed the second task or not, state machine program will mark the second task as either completed or suspended in project plan table 110 (step 550). State machine program then accesses clock program 106 to obtain a stop time stamp and records, at step 560, the stop time stamp for the second task in time table 104. State machine program resumes the suspended prior task at step 570. State machine program also accesses clock program 106 to obtain a start time stamp and records, at step 580, the start time stamp for the prior, suspended task in time table 104.

Figure 6:
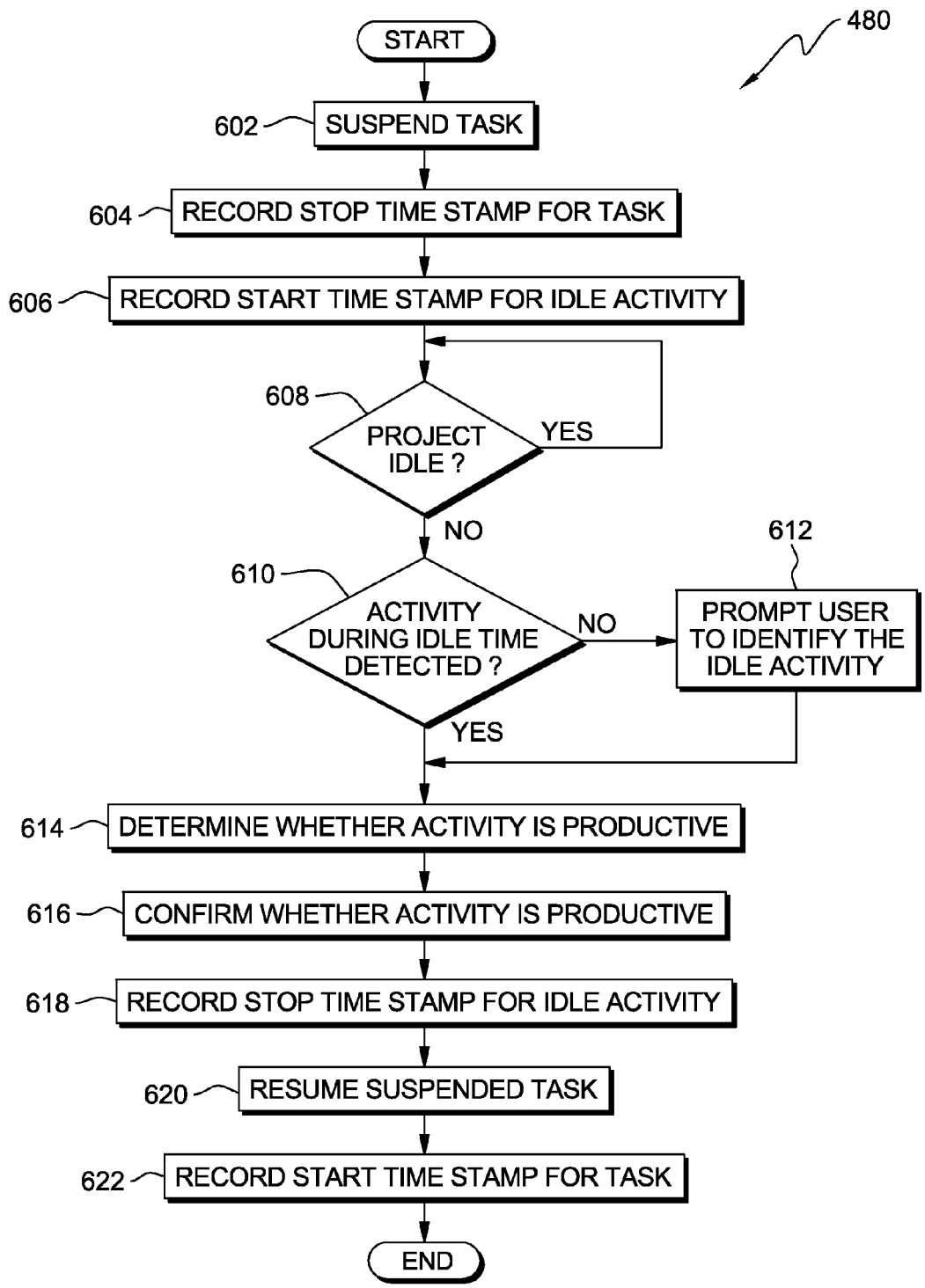
FIG. 6 illustrates in more detail a step performed by the state machine program of FIGS. 1 and 4 for automatically tracking project idle time, according to one embodiment of the present invention.

Refer again to decision 470, yes branch of FIG. 4 where the state machine program 470 accounts for idle time (step 480), FIG. 6 illustrates step 480 in more detail. In response to determining that a project has become idle (decision 470, yes branch), state machine program 102 suspends a task, at step 602, by marking the task as suspended in project plan table 110. State machine program 102 accesses clock program 106 to obtain a stop time stamp and records, at step 604, the stop time stamp for the task in time table 104. State machine program 102 also accesses clock program 106 to obtain a start time stamp and records, at step 606, the start time stamp for an idle time activity in time table 104.

When state machine program 102 determines that the project is no longer idle (decision 608, no branch), state machine program 102 determines whether the idle time activity performed is automatically detected (decision 610). For example, state machine program 102 automatically detects idle time activity that was triggered by computer system 100, such a phone call. However, state machine program 102 does not automatically detect idle time activity simply by detecting inactivity for a predefined period of time. Therefore, if state machine program 102 is not able to automatically detect the idle time activity, state machine program 102 prompts the user to specify the idle time activity (step 612).

State machine program 102 then determines, at step 614, whether the idle time activity, either automatically detected or specified by the user, is productive by accessing activity table 112 and comparing the activity to the predefined table of activities 112. It should be understood however, that not all idle time activities determined in step 614 will be listed in activity table 112. In such a case, state machine program 102 may ask the user to add the idle time activity to activity table 112 for future reference. When adding a new activity to activity table 112, state machine program may prompt the user to define whether the new activity is, by default, productive or not.

State machine program 102 then confirms, at step 616, whether the idle time activity is productive or not. For example, an activity such as making a telephone call may be listed as unproductive in activity table 112. A user may make a telephone call, however, that is related to the task, and therefore, productive. In such a case, the user may want to record time spent on the phone call as productive. Thus, state machine program 102 allows the user to override determinations made by state machine program 102 regarding whether or not an activity is productive.

State machine program 102 accesses clock program 106 to obtain a stop time stamp and records, at step 618, the stop time stamp for the idle time activity in time table 104. State machine program 102 then resumes the suspended task, at step 620. State machine program 102 accesses clock program 106 to obtain a start time stamp and records, at step 622, the start time stamp for the task in time table 104.

Figure 7:
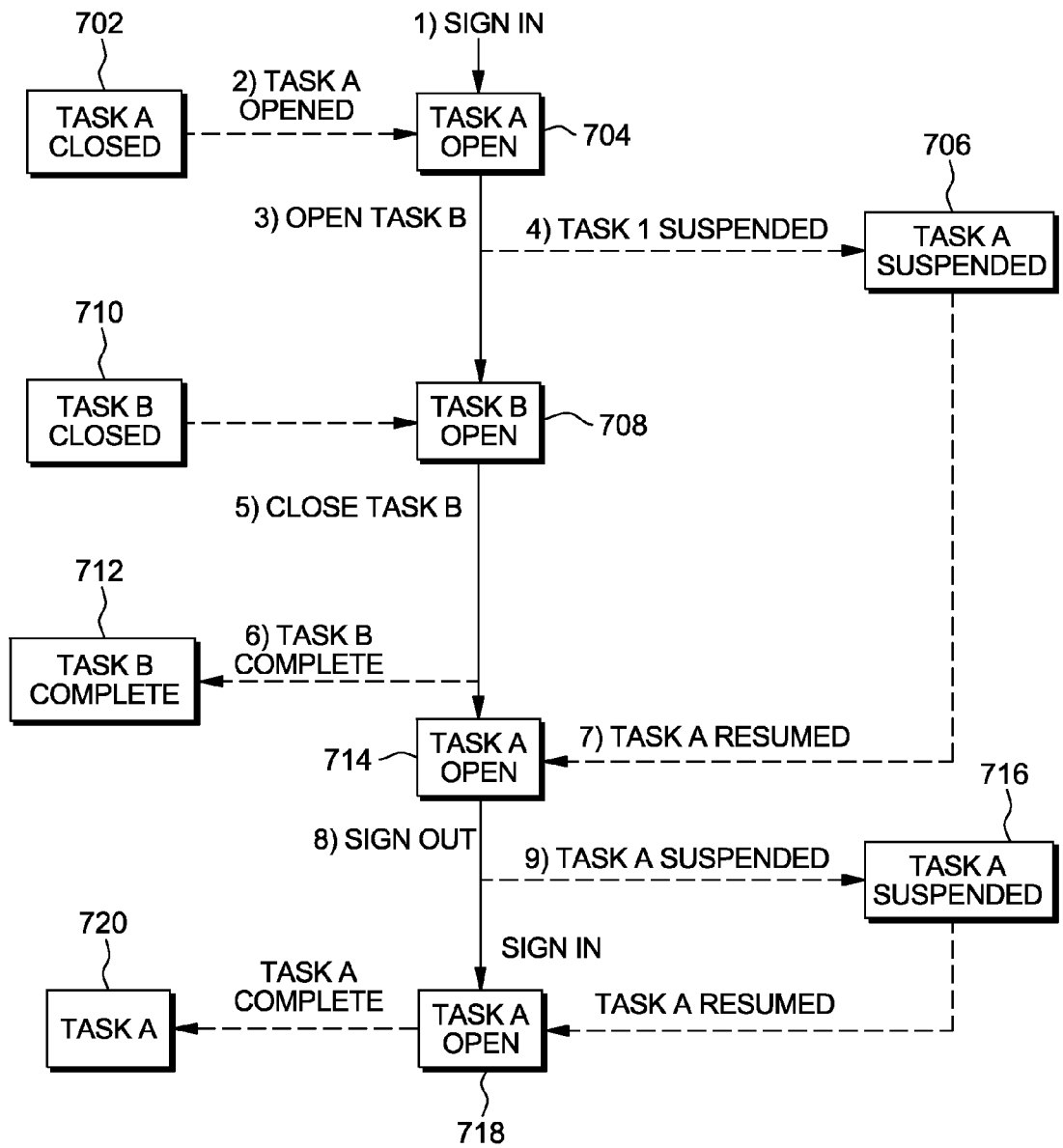
FIG. 7 illustrates a state diagram of a state machine program of FIG. 1 for automatically tracking time, according to one embodiment of the present invention.

FIG. 7 illustrates a state diagram of a state machine program of FIG. 1 for automatically tracking time, according to one embodiment of the present invention. Task A starts out in closed state 702. When a user opens a task, or when state machine program 102 automatically opens a task, state machine program 102 transitions task A from closed state 702 to open state 704. If a user then opens task B, state machine program 102 suspends task A and transitions task A from open state 704 to suspended state 706. State machine program 102 also transitions task B from closed state 710 to open state 708. When the user completes task B, state machine program 102 transitions task B from open state 708 to complete state 712. State machine program 102 also resumes task A and transitions task A from suspended state 706 to open state 714. When the user signs out, state machine program 102 suspends task A and transitions task A from open state 714 to suspended state 716. When the user signs back in, state machine program 102 resumes task A and transitions task from suspended state 716 to open state 718. When the user completes task A, state machine program 102 transitions task A from open state 718 to complete state 720.

Figure 8:
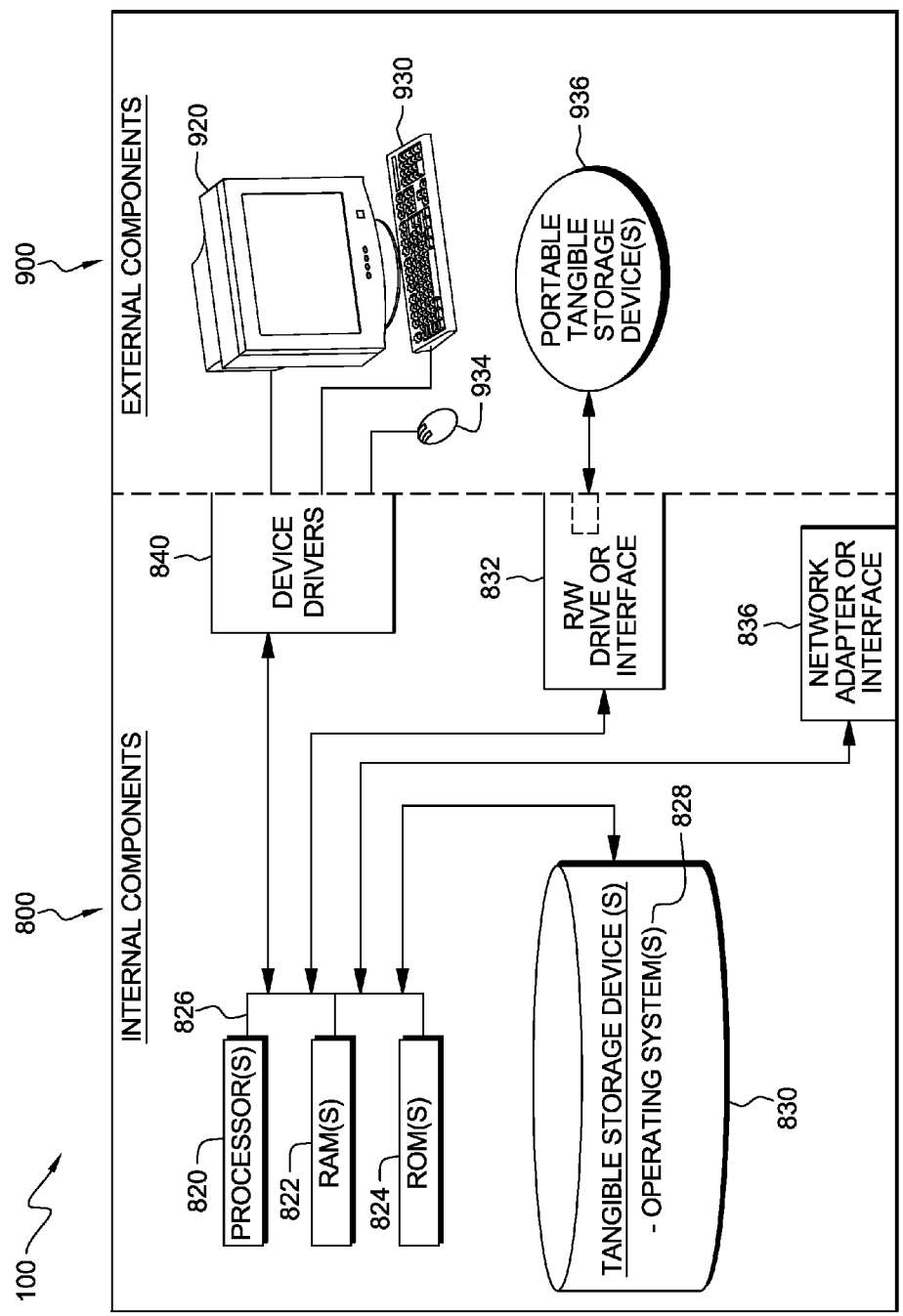
FIG. 8 illustrates internal and external real components of the computer system of FIG. 1.

FIG. 8 illustrates hardware and software components of computer system 100 of FIG. 1. Computer system 100 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828, state machine program 102, clock program 106, and reporting program 108 are stored on one or more of the computer-readable tangible storage devices 830 for execution by one or more of the processors 820 via one or more of the RAMs 822 (which typically include cache memory). Activity table 112, project plan table 110, and time table 104 are also stored on one or more computer-readable tangible storage devices 830. In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The state machine program 102, clock program 106, and reporting program 108 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The state machine program 102, clock program 106, and reporting program 108 can be downloaded to computer system 100 from an external computer via a network (for example, the Internet, a local area network or other, wide area network) and network adapter or interface 836. From the network adapter or interface 836, the state machine program 102, clock program 106, and reporting program 108 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

State machine program 102, clock program 106, and reporting program 108 can be written in various programming languages including low-level, high-level, object-oriented or non object-oriented languages. Alternatively, the functions of state machine program 102, clock program 106, and reporting program 108 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for automatically tracking time, the method comprising the steps of:
    a computer recording a start time for a first task to be performed by a user;
    the computer determining that the first task is not actively being performed by the user; and
    the computer recording an end time for the first task in response to determining that the first task is not being actively performed by the user.

2. The method of claim 1, further comprising the steps of:
    subsequent to the step of recording the end time for the first task, the computer determining that the user has resumed actively performing the first task; and
    the computer recording a second start time for the first task.

3. The method of claim 1, further comprising the steps of:
    the computer determining that the first task is complete; and
    the computer determining a total amount of time the user spent actively performing the first task based on a plurality of recorded start times and corresponding end times.

4. The method of claim 1, wherein the step of the computer determining that the first task is not being actively performed by the user comprises the step of:
    the computer determining that the user is performing an activity that is not defined within a scope of activity for the first task.

5. The method of claim 4, further comprising the steps of:
    the computer recording a start time and an end time for active performance of the activity by the user.

6. The method of claim 4, further comprising the steps of:
    the computer prompting the user to identify the activity; and
    in response to receiving an identification of the activity from the user, the computer determining whether the identified activity is productive towards completing the first task; and
    in response to determining that the identified activity is productive, recording time spent actively performing the identified activity as time spent actively performing the first task.

7. The method of claim 4, further comprising the steps of:
    the computer determining that the activity related to a second task to be performed by the user, and in response, recording time spent actively performing the activity as time spent actively performing the second task.

8. The method of claim 4, wherein the step of the computer determining that the user is performing an activity that is not defined within a scope of activity for the first task, comprises at least one of:
    the computer determining that a phone call has been received; and
    the computer determining that an application unrelated to the first task has been launched.

9. The method of claim 1, wherein the step of the computer determining that the first task is not being actively performed by the user comprises the steps of:
    the computer determining that no detectable activity has taken place on the first task for a specified period of time.

10. The computer system of claim 1, further comprising program instructions, stored on at least one of the one or more storage devices for execution by at least one of the one or more processors via at least one of the one or more memories, to:
    record a start time and an end time for active performance of the activity.

11. The computer system of claim 1, further comprising program instructions, stored on at least one of the one or more storage devices for execution by at least one of the one or more processors via at least one of the one or more memories, to:
    prompt the user to identify the activity;
    in response to receiving an identification of the activity from the user, determine whether the identified activity is productive towards completing the first task; and
    in response to determining that the identified activity is productive, record time spent actively performing the identified activity as time spent actively performing the first task.

12. The computer system of claim 1, further comprising program instructions, stored on at least one of the one or more storage devices for execution by at least one of the one or more processors via at least one of the one or more memories, to:
    determine that the activity is related to a second task to be performed by the user, and in response, record time spent actively performing the activity as time spent actively performing the second task.

13. A computer system for automatically tracking time, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to record a start time for a first task to be performed by a user;
    program instructions to determine the first task is not actively being performed by the user; and
    program instructions to record an end time for the first task in response to determining that the first task is not being actively performed by the user.

14. The computer system of claim 13, further comprising program instructions, stored on at least one of the one or more storage devices for execution by at least one of the one or more processors via at least one of the one or more memories, to:

subsequent to recording the end time for the first task, determine that the user has resumed actively performing the first task; and record a second start time for the first task.

15. The computer system of claim 13, further comprising program instructions, stored on at least one of the one or more storage devices for execution by at least one of the one or more processors via at least one of the one or more memories, to:

determine that the first task is complete; and determine a total amount of time the user spent actively performing the first task based on a plurality of recorded start times and corresponding end times.

16. The computer system of claim 13, wherein the program instructions to determine the first task is not being actively performed by the user comprise:

program instructions to determine that the user is performing an activity that is not defined within a scope of activity for the first task.

17. The computer system of claim 16, wherein the program instructions to determine that the user is performing an activity that is not defined within a scope of activity for the first task, comprise at least one of:

program instructions to determine that a phone call has been received; and program instructions to determine that an application unrelated to the first task has been launched.

18. The computer system of claim 13, wherein the program instructions to determine that the first task is not being actively performed by the user comprise:

program instructions to determine that no detectable activity has taken place on the first task for a specified period of time.

19. A computer program product for automatically tracking time, the computer program product comprising:

one or more computer-readable tangible storage devices and program instructions stored on at least one of the one or more storage devices, the program instructions comprising:

program instructions to record a start time for a first task to be performed by a user;

program instructions to determine the first task is not actively being performed by the user; and program instructions to record an end time for the first task in response to determining that the first task is not being actively performed by the user.

20. The computer program product of claim 19, wherein the program instructions to determine that the first task is not being actively performed by the user comprise:

program instructions to determine that the user is performing an activity that is not defined within a scope of activity for the first task.

* * * * *